United States Patent [19]

Mishima et al.

[11] Patent Number: 5,250,010

[45] Date of Patent: Oct. 5, 1993

[54] V-RIBBED BELT

[75] Inventors: Kyoichi Mishima, Higashimachi; Takashi Hamada, Kakogawa; Masayoshi Nakajima, Minami, all of Japan

[73] Assignee: Mitsuboshi Belting Ltd., Nagata, Japan

[21] Appl. No.: 647,148

[22] Filed: Jan. 29, 1991

[30] Foreign Application Priority Data

Jan. 29, 1990 [JP] Japan .................................. 2-23334

[51] Int. Cl.⁵ .............................................. F16G 5/08
[52] U.S. Cl. ................................................. 474/263
[58] Field of Search ............................... 474/260–264

[56] References Cited

U.S. PATENT DOCUMENTS

| | | | |
|---|---|---|---|
| 3,404,578 | 10/1968 | Koch | 474/263 |
| 4,127,039 | 11/1978 | Hollaway | 474/263 |
| 4,137,787 | 2/1979 | Waugh | 474/263 |
| 4,299,587 | 11/1981 | Imamura | 474/263 |
| 4,434,019 | 2/1984 | Hollaway | 474/263 |
| 4,504,258 | 3/1985 | Tanaka | 474/263 |
| 4,555,241 | 11/1985 | Takano et al. | |
| 4,643,938 | 2/1987 | Oyama | 474/263 |
| 4,721,496 | 1/1988 | Yokoyama | 474/263 |
| 4,740,192 | 4/1988 | Mashimo | 474/263 |
| 4,798,566 | 1/1989 | Sedlacek | 474/263 |

FOREIGN PATENT DOCUMENTS

| | | |
|---|---|---|
| 59-208245 | 11/1984 | Japan . |
| 60-172749 | 9/1985 | Japan . |
| 62104848 | 10/1985 | Japan . |
| 62106146 | 10/1985 | Japan . |

*Primary Examiner*—Peter M. Cuomo
*Assistant Examiner*—Flemming Saether
*Attorney, Agent, or Firm*—Wood, Phillips, VanSanten, Hoffman & Ertel

[57] ABSTRACT

A power transmission belt having a length and a lateral extent. The belt consists of a tension layer and a compression layer with the compression layer defined at least partially by acrylonitrile-butadiene copolymer rubber (hydrogenated nitrile rubber), having at least an 80% hydrogen addition rate, and a plurality of substantially laterally oriented fibers in the acrylonitrile-butadiene copolymer rubber in the compression layer. The fibers are treated with one of resorcin-formalin-nitrile rubber latex (RFL) and resorcin-formalin-hydrogenated nitrile rubber latex (RFL) having at least an 80% hydrogen addition rate.

20 Claims, 1 Drawing Sheet

V-RIBBED BELT

BACKGROUND OF THE INVENTION

1. Field of the Invention

This invention relates to power transmission belts and, more particularly, to a belt in which at least a portion of the compression layer thereof is formed from a rubber composite material exhibiting excellent wear and running characteristics at both high and low temperatures in both dry and damp environments.

2. Background Art

V-ribbed belts have many features which have made them highly useful in several diverse environments, including, for example: the automotive and general purpose vehicle industries; the agricultural industry for equipment such as tractors; the electrical industry for a wide range of equipment, etc. Most notable of the desirable features of the V-ribbed belt is the inherent flexibility that it has. It is generally thinner than a single rib V-belt, resulting in minimal bending stresses in operation. This flexibility permits the V-ribbed belt to be incorporated into a system with very small diameter pulleys. The advantage of this is that the overall system into which the V-ribbed belt is incorporated may be made very compact. The use of V-ribbed belts also accounts for a substantial energy savings in the systems in which they are operated. A further advantage of the V-ribbed belt is that the individual ribs are not required to penetrate a complementary pulley groove as deeply as a conventional single rib V-belt. This results in less friction development upon the ribs entering and withdrawing from the grooves and, in addition to affording energy savings, results in reduced belt wear and ultimately longer belt life.

While the V-ribbed belt has all of the above advantages, such belts also have some inherent limitations. There is a tendency of the belt to slip when an excessive load is driven by the belt. Further, any variation in loading on the system may produce the same slippage. This slippage over time removes a substantial amount of the rubber from the ribs and may cause cracks to develop therein with resulting shortening of the life of the belt.

Typically, the V-ribbed belt consists of an inner compression section/layer and an outer tension section/layer. Between the compression and tension sections/layers are typically included a plurality of longitudinal tensile cords which are embedded in parallel relationship in an adhesive rubber layer. At least part of the compression section is defined by longitudinally extending, laterally spaced, V-shaped ribs. It is known in the belt art to embed short fibers in the compression rubber layer. Typically these fibers are included in amounts between 20 to 40 parts by weight of fiber to 100 parts by weight of matrix rubber.

A typical rubber used for general purpose application is chloroprene rubber (CR). It is known in the art to improve durability under severe conditions by using epichlorohydrin rubber (CHR), chlorosulfonated polyethylene rubber (CSM), ethylene-propylene-diene rubber (EPDM), etc. These rubbers exhibit excellent resistance to high temperatures.

However, there are various drawbacks with each of these materials which have been contended with in the prior art. Epichlorohydrin rubber (CHR) operates poorly, and has insufficient flexibility, in cold environments. Chlorosulfonated polyethylene rubber (CSM) generates a substantial amount of internal heat during operation and has poor resistance to cold temperatures and oil. Ethylene-propylene-diene rubber (EPDM) is also detrimentally affected by oil.

SUMMARY OF THE INVENTION

The present invention is specifically directed to overcoming the above enumerated problems in a novel and simple manner. The invention is directed to a power transmission belt having a length and a lateral extent. The belt consists of a tension layer and a compression layer with the compression layer defined at least partially by acrylonitrile-butadiene copolymer rubber (hydrogenated nitrile rubber), having at least an 80% hydrogen addition rate, and a plurality of substantially laterally oriented fibers in the acrylonitrile-butadiene copolymer rubber in the compression layer. The fibers are treated with one of resorcin-formalin-nitrile rubber latex (RFL) and resorcin-formalin-hydrogenated nitrile rubber latex (RFL) having at least an 80% hydrogen addition rate.

The rubber in the compression layer has excellent running and wear characteristics when subjected to both hot and cold temperatures. The fibers prevent cracking in the compression layer rubber as there is normally a tendency for the rubber to do when radical temperature changes are encountered. The inventive belt is highly durable in a wide range of temperatures under severe conditions of high load and high speed operation. The present invention contemplates a belt with a very long life.

The belt has laterally spaced edges. In another aspect of the invention, the fibers are exposed at at least one of the laterally spaced edges, and preferably at both edges. This accounts for excellent wear resistance and prevents the development of a liquid layer between the belt and a cooperating pulley as might otherwise occur in the absence of the fibers, particularly in damp operating environments. Because the fibers prevent moisture buildup between the driving edges of the ribs and a cooperating pulley, abrupt changes in the frictional coefficient of friction for the belt in damp environments, which might alter the operating characteristics of the system in which the belt is incorporated, are avoided. Further, the fibers prevent sound generation from contact between the belt and cooperating pulley in operation.

Preferably, the fibers are mixed in the ratio of between 5–30 parts by weight of fibers to 100 parts by weight of acrylonitrile-butadiene copolymer. This quantity of fiber has been found to maximize durability without significantly diminishing flexibility.

Preferably, the fibers have a length of between 2–10 mm. This range of fiber length provides the desired reinforcement to the compression layer and allows the fibers to remain intact during operation.

The fibers may be twisted or untwisted filament yarns. When twisted, the filament yarns preferably contain 5–15 twists/10 cm.

In one form of the invention, the twisted filament yarns are treated by dipping the fibers in one of resorcin-formalin-nitrile rubber latex (RFL) and resorcin-formalin-hydrogenated nitrile rubber latex (RFL), with at least an 80% hydrogen addition rate, and thereafter cut to desired lengths.

In a preferred form, the fibers are aromatic polyamide fibers. Alternatively, the fibers may be a mixture of 6,6 nylon and aromatic polyamide fiber.

Load carrying cords are normally provided between the tension and compression layers, with the cords made of ropes formed preferably from one of polyester, nylon and aromatic fiber.

The invention can be practiced with any of a number of belt configurations. For example, the belt in which the invention is incorporated may be a V-belt, a V-ribbed belt, a cogged belt, etc.

DETAILED DESCRIPTION OF THE PREFERRED EMBODIMENTS

Figure 1:
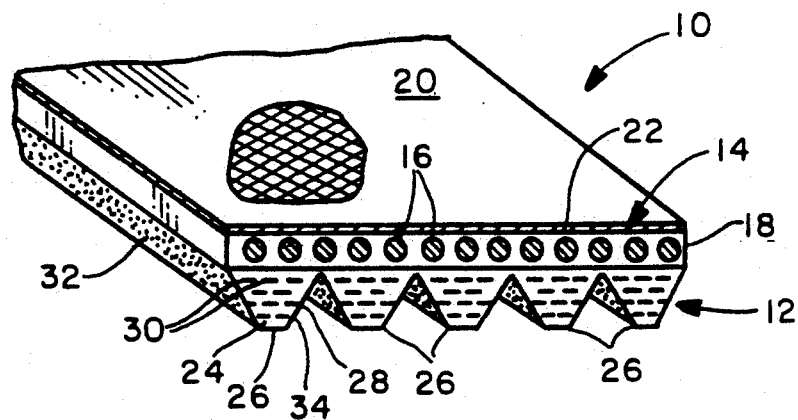
FIG. 1 is a perspective view of a cross section of a V-ribbed belt made according to the present invention.

In FIG. 1, a V-ribbed belt is shown at 10, made in accordance with the present invention. The belt 10 has a compression section 12 and a tension section 14 between which a plurality of longitudinally extending, load carrying cords 16 are provided. The cords 16 define the neutral axis for the belt 10 and are preferably low elongation, high strength ropes made up of polyester, nylon, or aromatic polyamide fibers. The cords 16 are embedded in an adhesive rubber layer 18, which is made up of one or a combination of natural rubber (NR), styrene butadiene rubber (SBR), chloroprene rubber (CR), etc. A rubber coated canvas layer 20 is adhered to the outer surface 22 of the tension section 14. While one such canvas layer 20 is shown, the invention contemplates that a plurality of canvas layers might be used. Each canvas layer 20 preferably is made up of woven weft and warp cotton yarns laminated to or otherwise suitably adhered to the outer surface 22 of the tension section 14.

The compression section 12 is defined by a rubber material 24 which is cut to define a plurality of longitudinally extending, V-shaped ribs 26 with grooves 28 defined between adjacent ribs 26 for accommodating a matched pulley (not shown). The ribs 26 are made at least partially, and preferably entirely, from acrylonitrile-butadiene copolymer rubber having at least an 80% hydrogen addition rate.

A plurality of laterally directed, generally aligned, fibers 30 are embedded in the ribs 26. Preferably, the fibers 30 are made up of a mixture of 6,6 nylon and aromatic polyamide fibers. Alternatively, the fibers 30 may be solely synthetic fiber yarns of aromatic polyamide fiber. The fibers 30 may be twisted or untwisted. If twisted, there are preferably 5 to 15 twists per 10 centimeters, with the twists being wrapped in one direction.

The fibers 30 in the compression section 12 are preferably pretreated with one of resorcin-formalin-nitrile rubber latex (RFL) and resorcin-formalin-hydrogenated nitrile latex (RFL) having at least an 80% hydrogen addition rate. The fibers 30 are preferably treated by dipping the same in the latex composition.

In a preferred method of manufacture using twisted fibers, the fibers 30 are initially twisted to produce a cord. The cord is then dipped in the treating composition and thereafter cut to lengths of 2–10 mm.

The 2 to 10 mm length for the fibers 30 is preferred for the following reasons. If the length of the fibers 30 is less than 2 mm, its reinforcing effect in the compression section 12 of the belt 10 is relatively insignificant. If the length of the fibers 30 is greater than 10 mm, the fibers 30 tend to a) entangle with each other; and b) be distributed nonuniformly as they are kneaded into the rubber of the compression section 12. The flexibility and durability of the belt thus becomes non-uniform throughout compression section 12 of the belt 10. Further, the long fibers 30 tend to break in operation.

Preferably, the fibers 30 are mixed in a proportion of 5 to 30 parts by weight of fiber to 100 parts by weight of acrylonitrile-butadiene copolymer rubber. If the fibers 30 are mixed in proportions less than 5 to 100 parts by weight, the belt 10 deforms too readily when: it is highly tensioned; there is a large load; or rapid variation in the belt speed occurs. The result is that the lifetime of the belt 10 is undesirably shortened.

If the amount of short fibers 30 exceeds 30 to 100 parts by weight, while the belt 10 then exhibits excellent resistance against deformation and wear, it becomes too inflexible. The result is that the compression rubber layer tends to crack, particularly when tightly wrapped around small-diameter pulleys and used in environments where the belt is oppositely bent, as in a serpentine system. The belt life is detrimentally shortened.

In a preferred form, the fibers 30 are exposed at the laterally oppositely facing edges 32, 34 of each rib 26. This provides a sound deadening cushion between the belt 10 and any cooperating pulley (not shown). The exposed fibers 30 minimize the rubber-to-pulley contact area to thereby minimize wear on the rubber ribs 24 engaging the cooperating pulley. At the same time, the fibers 30 allow moisture to drain through so that a liquid barrier layer does not develop between the ribs 26 and cooperating pulley. The result of this is that even in a damp environment, the operating characteristics of the belt, particularly the transmission performance, remain substantially the same. The belt also remains quiet in operation.

It should be understood that while the invention is described with respect to a V-ribbed belt 10, it can be practiced with any type of belt having a compression layer. For example, a low edge belt, cogged belt, simple V-belt, etc. can be manufactured employing the concepts of the present invention.

Below is a demonstration of the improved durability, transmission performance, and sound deadening that are realized with belts according to the present invention, compared to conventional belt structures.

The following designations are used below for the belt test samples:

"Experimental sample"—identifies a belt according to the present invention; and

"Comparison sample"—identifies a belt with certain properties altered from the inventive belt.

A V-ribbed belt, conventionally identified by the number 3PK1100, was used in the experiment. This belt is one of many different types of belts with which the invention can be practiced.

TEST NO. 1—DURABILITY TEST

Experimental Sample No. 1

As shown in Table I, this V-ribbed belt 10 had a composite compression rubber layer formed as follows:
1. H-NBR (90% hydrogen addition rate) in the amount of 100 weight parts per hundred of rubber (pHR); and
2. Short, untwisted fibers dipped in RFL and embedded in the matrix layer with the fibers having the following properties:
   6,6 nylon—10 pHR; and
   aromatic polyamide—10 pHR Note:
1. NBR latex was used as latex in RFL.
2. Prior to RFL dipping, the aromatic polyamide fiber was treated with an epoxy resin.
3. The other rubber compound ingredient was omitted.

Figures 2, 3:
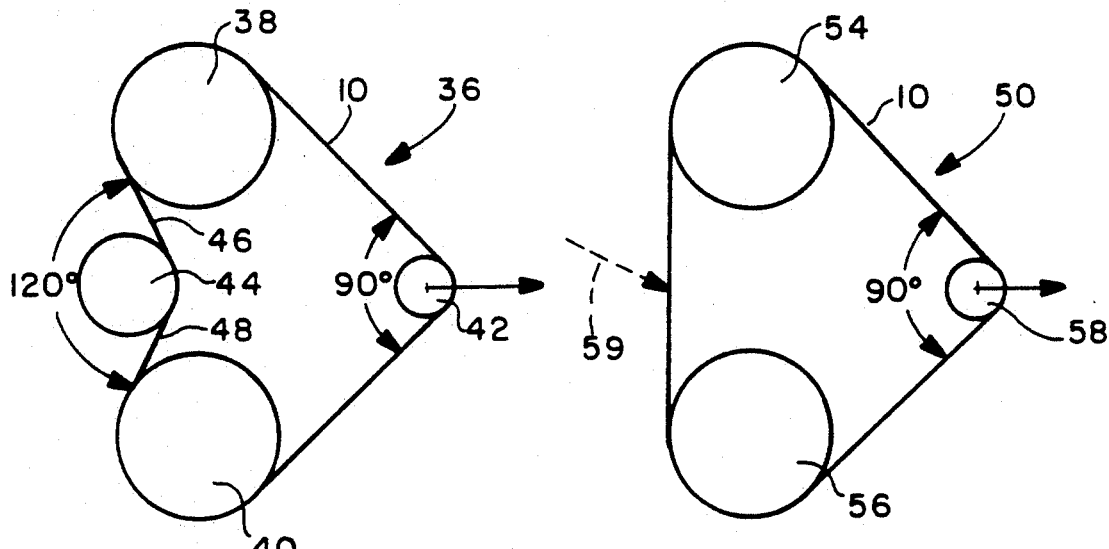
FIG. 2 is a schematic representation of a setup for testing the durability of a running belt.
FIG. 3 is a schematic representation of setup for testing transmission performance and sound generation for a running belt.

The belt 10 was engaged in a reverse, 4-shaft feeding test machine, as shown at 36 in FIG. 2. The test machine 36 has:
1. A drive pulley 38 having a diameter of 120 mm and rotating at 4900 rpm;
2. A driven pulley 40 having a diameter of 120 mm and a load of 12 H.P.; and
3. A tension pulley 42 having a diameter of 45 mm and pressed from left to right in FIG. 2 against the belt 10 with a force of 57 Kg.

The belt 10 was pressed against by an idler pulley 44 from left to right in FIG. 2 with sufficient force that a winding angle of 120°, as indicated in FIG. 2, was developed between the bent belt portions 46, 48. The system 36 was operated until the bottom of the belt 10 cracked. The times for cracks to generate were recorded at various temperatures from −30° C. to 130° C.

Comparison Samples

Three different comparison samples were tested over the same temperature range.

Comparison Sample No. 1

The latex of the RFL of Experimental Sample No. 1 was replaced with styrene-butadiene-vinyl pyridine three-dimensional copolymer rubber latex (VP).

Comparison Sample No. 2

The short fibers of this sample were not dipped.

Comparison Sample No. 3

The polymer of the Experimental sample No. 1 was replaced with chloroprene rubber (CR), and the latex of the RFL was dipped in VP.

Results

The results of the tests are indicated below in Table I.

TABLE I

|  |  | Experimental Sample 1 | Comparison Sample 1 | Comparison Sample 2 | Comparison Sample 3 |
|---|---|---|---|---|---|
| Type of Polymer | | HNBR | HNBR | HNBR | CR |
| Material of short fiber and number of parts of mixture | 6,6 nylon | 10 | 10 | 10 | 10 |
| | aromatic polyamide | 10 | 10 | 10 | 10 |
| Presence or absence of dipping of short fiber | | yes | yes | no | yes |
| Type of latex RFL | | NBR | VP | — | VP |
| Time until compression rubber cracks (hrs) | Atmospheric temperature °C. | | | | |
| | 130° C. | 150 | 100 | 80 | 15 |
| | 120° C. | 240 | 150 | 130 | 30 |
| | 85° C. | 2000 | 450 | 400 | 200 |
| | −30° C. | 150 | 25 | 10 | 30 |

Conclusions

As can be seen from the results, the V-ribbed belt of the present invention (Experimental Sample No. 1) improves durability by approximately 1.5 to 15 times over that of the conventional-type belts tested (Comparison samples Nos. 1–3). The durability of the inventive belt is remarkably improved over a wide temperature range.

TEST NO. 2—TRANSMISSION PERFORMANCE AND SOUND GENERATION TEST

Figure 4:
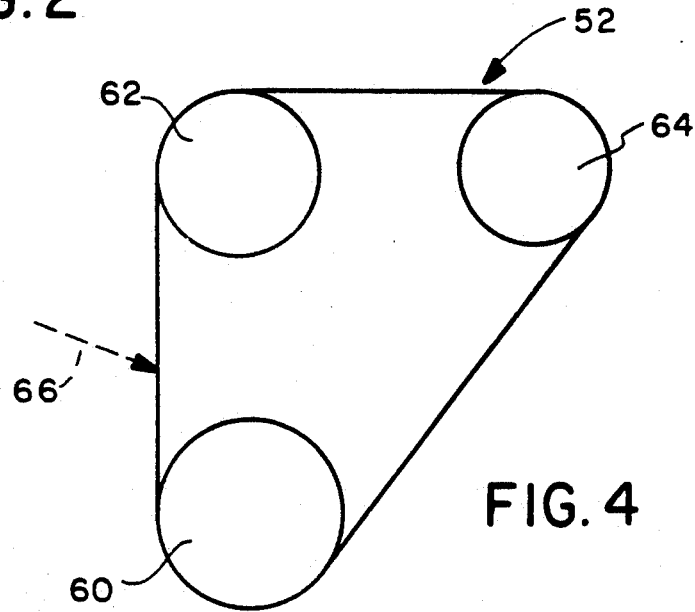
FIG. 4 is a schematic representation of an alternative setup for testing transmission performance and sound generation for a running belt.

Experimental Sample No. 1, and a variation thereof (Experimental Sample No. 2), having only aromatic polyamide fibers, were tested in running test machines, shown schematically respectively in FIGS. 3 and 4 at 50 and 52, and compared to Comparison Sample No. 4. The machine 50 in FIG. 3 has:
1. A drive pulley 54 with a diameter of 120 mm rotated at 2000 rpm;
2. A driven pulley 56 having a diameter of 120 mm, with a variable load; and
3. A tension pulley 58 having a 45 mm diameter and moved from left to right in FIG. 3 against the inside of the belt 10 with 20 kg of force.

The LT coefficients for each rib at which both 2% slip (in dry environment) and 1% slip (with water being poured on the belt as indicated schematically by arrow 58) occurred were measured.

The test belts 10 were also engaged in the system 52 in FIG. 4 which has:
1. A drive pulley 60 with a diameter of 150 mm operated at 600 rpm;
2. A driven pulley 62, such as a power steering pulley, having a diameter of 130 mm; and
3. A driven pulley 64, such as an air conditioning pulley, having a 120 mm diameter, with 1.5° of misalignment of the power steering pulley 62 and air conditioning pulley 64.

Sound generation was measured as water was being poured onto the belt 10, as indicated schematically by the arrow 66 in FIG. 4.

Comparison Sample No. 4

Comparison sample No. 4 was modified by replacing the short fibers of Experimental Sample No. 1 with 6,6 nylon fibers alone. All other properties are the same.

Results

The results of the transmission performance and sound generation tests are described in Table II, below.

TABLE II

|  | Experimental Sample 1 | Experimental Sample 2 | Comparison Sample 4 |
|---|---|---|---|
| Type of Polymer | HNBR | HNBR | HNBR |
| Material of short fiber and number of parts of mixture | 6,6 nylon 10 / aromatic polyamide 10 | — / 20 | 20 / — |
| Presence or absence of dipping of short fiber | yes | yes | yes |
| Type of latex RFL | NBR | NBR | NBR |
| LT coefficient/rib — dry | 4.0 | 4.0 | 3.5 |
| LT coefficient/rib — water pouring | 3.5 | 3.5 | 1.0 |
| Sound production | O | O | X |

Note:
1. Load on belt was 20 kg.
2. Slip rate: 2% in dry environment; and 1% with water poured against belt.
3. Sound production - O = good; X = bad.
4. LT = $(1230 \times P)/(D \times N \times A \times B \times 10^{-7})$ with:
   P = load at 2% or 1% slipping (kw)
   D = pulley diameter (mm)
   N = rotating speed of pulley (rpm)
   A = contact/engaging angle between belt and pulley
   B = number of ribs

Conclusion

As apparent from the results, V-ribbed belts, made according to the present invention exhibit a very small decrease in the transmission performance in the presence of water and generated no detectable sound compared to conventional belts tested under the same conditions.

The foregoing disclosure of specific embodiments is intended to be illustrative of the broad concepts comprehended by the invention.

We claim:

1. A V-ribbed belt having a length and a lateral extent, said V-ribbed belt comprising:
   a tension layer;
   a compression layer having longitudinally extending, laterally spaced, V-shaped ribs having grooves defined therebetween; and
   a plurality of tensile cords extending lengthwise of the V-ribbed belt between the tension layer and the compression layer,
   said compression layer defined at least partially by acrylonitrile-butadiene copolymer rubber having at least an 80% hydrogen addition rate,
   there being a plurality of substantially laterally oriented fibers in the acrylonitrile-butadiene copolymer rubber in the compression layer,
   said fibers comprising untwisted filament yarns,
   said plurality of fibers being treated with one of resorcin-formalin-nitrile rubber latex and resorcin-formalin-hydrogenated nitrile latex having at least an 80% hydrogen addition rate.

2. The V-ribbed belt according to claim 1 wherein the V-ribbed belt has laterally spaced edges and the at least some of the fibers have a portion exposed at at least one of the laterally spaced edges.

3. The V-ribbed belt according to claim 1 wherein the fibers are mixed in the ratio of between 5 to 30 parts by weight of fibers to 100 parts by weight of acrylonitrile-butadiene copolymer.

4. The V-ribbed belt according to claim 1 wherein there is at least one layer of canvas on the tension layer.

5. The V-ribbed belt according to claim 1 wherein the fibers comprise untwisted filament yarns.

6. The V-ribbed belt according to claim 1 wherein the fibers comprise twisted filament yarns.

7. The V-ribbed belt according to claim 1 wherein the fibers comprise unidirectionally twisted filament yarns with 5-15 twists/10 cm.

8. The V-ribbed belt according to claim 1 wherein the filament yarns are dipped in one of resorcin-formalin-nitrile rubber latex and resorcin-formalin-hydrogenated nitrile rubber latex and thereafter cut in desired lengths.

9. The V-ribbed belt according to claim 1 wherein the fibers comprise aromatic polyamide fibers.

10. The V-ribbed belt according to claim 1 wherein the fibers comprise a mixture of 6,6 nylon and aromatic polyamide fiber.

11. The V-ribbed belt according to claim 1 wherein the V-ribbed belt has laterally spaced edges and at least some of the fibers have a portion exposed at at least one of the laterally spaced edges.

12. A power transmission belt having a length and a lateral extent, said power transmission belt comprising:
    a tension layer; and
    a compression layer,
    said compression layer defined at least partially by acrylonitrile-butadiene copolymer rubber having at least an 80% hydrogen addition rate,
    there being a plurality of substantially laterally oriented fibers in the acrylonitrile-butadiene copolymer rubber in the compression layer,
    said plurality of fibers being treated with one of resorcin-formalin-nitrile rubber latex and resorcin-formalin-hydrogenated nitrile latex having at least an 80% hydrogen addition rate,
    said fibers comprising untwisted filament yarns.

13. The power transmission belt according to claim 12 wherein the fibers are mixed in the ratio of between 5 to 30 parts by weight of fibers to 100 parts by weight of acrylonitrile-butadiene copolymer.

14. The power transmission belt according to claim 12 wherein the power transmission belt has laterally spaced edges and a plurality of the fibers are exposed at at least one of the laterally spaced edges.

15. The power transmission belt according to claim 12 wherein the fibers comprise uni-directionally twisted filament yarns.

16. The power transmission belt according to claim 12 the fibers comprise untwisted filament yarns.

17. The power transmission belt according to claim 12 wherein the fibers comprise twisted filament yarns with 5-15 twist/10 cm.

18. The power transmission belt according to claim 12 wherein the fibers comprise aromatic polyamide fibers.

19. The power transmission belt according to claim 12 wherein the fibers comprise a mixture of 6,6 nylon and aromatic polyamide fiber.

20. The power transmission belt according to claim 12 including load carrying cords between the tension and compression layers, said cords made of ropes formed by one of polyester, nylon and aromatic fiber.

* * * * *